(12) United States Patent
Tanahashi et al.

(10) Patent No.: US 6,747,619 B1
(45) Date of Patent: Jun. 8, 2004

(54) METHOD OF EVALUATING FRONT OF SCREEN QUALITY AND APPARATUS FOR EVALUATING FRONT OF SCREEN QUALITY USING THE SAME

(75) Inventors: Kosei Tanahashi, Fujisawa (JP); Yumi Mori, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/481,358

(22) Filed: Jan. 12, 2000

(30) Foreign Application Priority Data

Jan. 20, 1999 (JP) .......................................... 11-011885

(51) Int. Cl.[7] ............................ G09G 3/36; H04N 17/00
(52) U.S. Cl. ............................ 345/87; 345/89; 348/189
(58) Field of Search ..................... 345/87, 214, 207, 345/89; 348/189, 190, 191

(56) References Cited

U.S. PATENT DOCUMENTS

| | | | | |
|---|---|---|---|---|
| 4,963,828 A | * | 10/1990 | Kawame et al. | ............ 348/189 |
| 5,838,396 A | * | 11/1998 | Shiota et al. | ................ 348/745 |
| 6,018,361 A | * | 1/2000 | Fujii et al. | ................. 348/190 |
| 6,020,919 A | * | 2/2000 | Fujii et al. | ................... 348/190 |
| 6,310,650 B1 | * | 10/2001 | Johnson et al. | ............. 348/189 |

* cited by examiner

*Primary Examiner*—Dennis-Doon Chow
*Assistant Examiner*—Alecia D. Nelson
(74) *Attorney, Agent, or Firm*—Louis J. Percello; F.Chau & Associates, LLC

(57) ABSTRACT

In the method of quantitatively evaluating the front of screen quality of a screen to be checked, an image of the screen to be checked is captured. The image of the LCD panel is captured preferably in a state in which the screen to be checked of the LCD panel is on. The captured image is processed and evaluated preferably in accordance with a predetermined algorithm. In the present invention, a manual evaluation is not performed at all. Thus, the front of screen quality of the screen to be checked of the LCD panel or the like, for example, can be quantitatively evaluated.

6 Claims, 2 Drawing Sheets

CAPTURED IMAGE

DIFFERENTIATED IMAGE

METHOD OF EVALUATING FRONT OF SCREEN QUALITY AND APPARATUS FOR EVALUATING FRONT OF SCREEN QUALITY USING THE SAME

BACKGROUND OF THE INVENTION

1. Field of the Invention

The present invention relates to a method of quantitatively evaluating a front of screen quality of, preferably, an LCD (Liquid Crystal Display) panel which is mainly used as a display for a notebook PC, and an apparatus for evaluating the front of screen quality using the same.

2. Description of the Related Art

Recently, an LCD panel, for example, has been widely used as a display for a notebook PC or the like. This LCD panel may have a defect such as non-uniformity. When the LCD panel has such a defect beyond a limit, the LCD panel cannot be used as the display. Thus, it is necessary to evaluate a front of screen quality of each LCD panel. The evaluation of the front of screen quality has been heretofore performed in the following manner. A quality boundary sample for the non-uniformity or the like is made in accordance with a front of screen quality criterion of liquid crystal display. Then, a measurer visually compares the sample and the LCD panel to be checked, thereby determining whether or not the LCD panel is defective.

The above-described conventional method of evaluating the front of screen quality has the following problems due to the evaluation by the measurer.

1) The comparison between the quality boundary sample and the LCD panel depends on a human sense. Moreover, the non-uniformity of the sample vary in shape or the like. Therefore, the comparison needs a human discretion and thus a measured value is prone to depend on the measurer, or the comparison requires a visual alignment by the measurer.

2) The determination is basically made in accordance with information about a luminance difference and an area. Thus, the non-uniformity due to a steep luminance difference such as a lack of dots or lines are ambiguously discriminated from the non-uniformity due to a gentle gradation. Consequently, the determination may differ depending on the measurers.

SUMMARY OF THE INVENTION

The present invention is directed to a method and an apparatus for quantitatively evaluating a front of screen of a screen to be checked. In this method of evaluating the front of screen quality, preferably, an image of an LCD panel is captured and the captured image is processed and evaluated in a state in which the screen to be checked of the LCD panel is on. The apparatus for evaluating the front of screen quality comprises an image capturing apparatus for detecting an absolute value of luminance, and a data processing apparatus for processing captured image data. The apparatus is constituted so as to carry out the above-described method of evaluating the front of screen quality. In the present invention, a manual evaluation is not performed at all. Thus, the front of screen quality of the screen to be checked of the LCD panel or the like, for example, can be quantitatively evaluated.

DETAILED DESCRIPTION OF PREFERRED EMBODIMENTS

A method of evaluating a front of screen quality and an apparatus for evaluating the front of screen quality using the same according to the present invention are applied to a field of a flat display such as an LCD and a plasma display, a CRT, a print, painting or the like. More particularly, the present invention can be suitably used for the evaluation of an LCD panel. The present invention is particularly suitable for use in the evaluation of the LCD panel for the following reason. The LCD panel has low lamp luminance in order to achieve low power consumption, thus components having high transmittance are used as various components of liquid crystal, and therefore even slight non-uniformity is noticeable. The method of evaluating the front of screen quality and the apparatus for evaluating the front of screen quality using the same according to the present invention will be described below by taking the LCD panel as an example.

Figure 1:
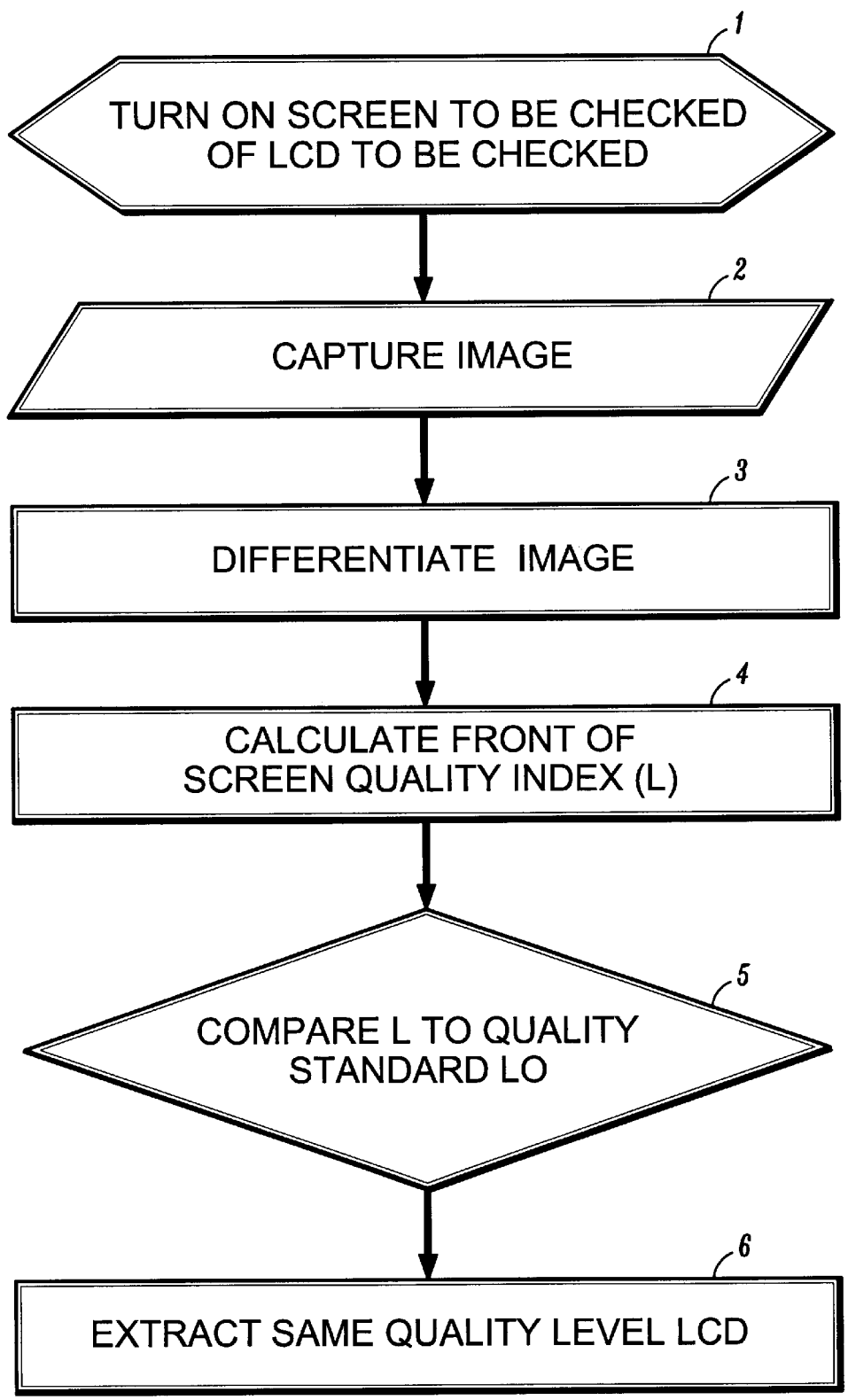
FIG. 1 is a flow chart for describing one example of a method of evaluating a front of screen quality according to the present invention.

FIG. 1 is a flow chart for describing one example of the method of evaluating the front of screen quality according to the present invention. The present invention will be described with reference to FIG. 1. First, the LCD panel displays a screen to be checked (Step 1). Preferably, the screen to be checked is typically lighted with a white light over the whole screen. The screen may be lighted with a monochromatic light such as R, G or B. The luminance of the screen to be checked may be high or low. Next, an image of the LCD panel displaying the screen to be checked is captured by an image capturing apparatus as a digital data image composed of 512×12 pixels, for example, and then the captured image is converted into a numerical value expressed as 256 gray levels, for instance (Step 2). Preferably, the image capturing apparatus for detecting an absolute value of the luminance is used as an image input apparatus. For example, Minolta CA-1000 is used. A digital camera, which is widely used as an alternative to a silver halide camera, detects a relative value of the luminance. Thus, when such a digital camera is used, the detected luminance is converted into the numerical value corresponding to the absolute value and the converted value is processed.

Figure 2:
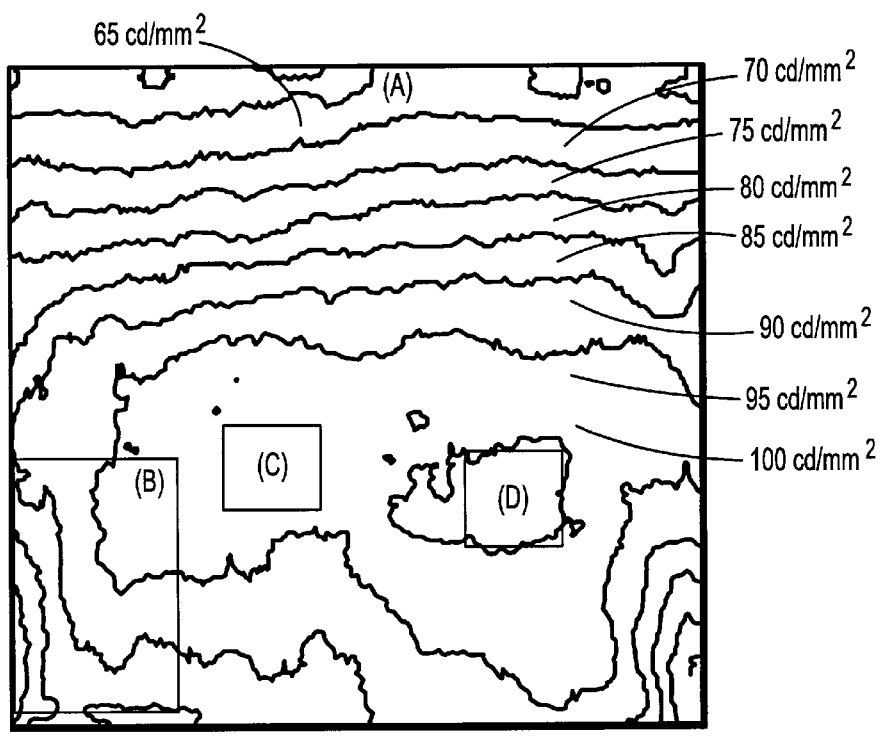
FIG. 2 shows one example of an actually captured image of an LCD panel in which regions having the same gray level are connected by a line for ease of seeing.

FIG. 2 shows one example of the image captured by the image capturing apparatus. In the example of FIG. 2, for ease of seeing, data having the same gray level of the captured image are connected by a line. Regions having low luminance, i.e., an upper side, a lower left corner and a lower right corner seem to be recognized as defective regions in accordance with FIG. 2 showing the absolute value of the luminance of the captured image. However, only the lower left and right corners are visually defective. It is considered that such a difference between the captured image and a sensuous check is made because a slow change in the luminance is not visually recognized as a defect and a sharp change alone has an adverse effect on the sense of sight.

Figure 3:
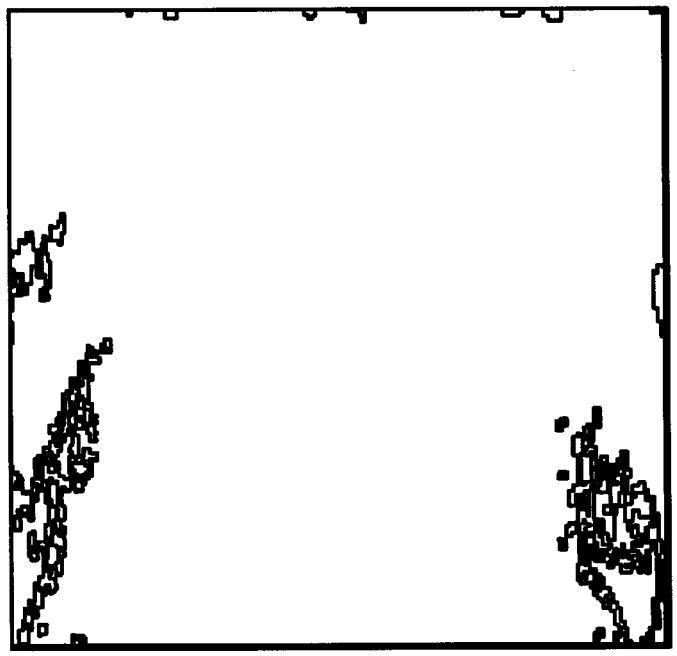
FIG. 3 shows one example of a differentiated image obtained by differentiating the actually captured image shown in FIG. 2.

Next, the image converted into the numerical value is differentiated so as to clearly exhibit contours of non-uniformity (Step 3). One example of the differentiated image is shown in FIG. 3. The differentiated image of FIG. 3 matches the region in which the non-uniformity is visually noticeable. Subsequently, a front of screen quality index (L) is calculated by use of an area at each gray level (Step 4). A differential value at each gray level is multiplied by an area ratio at the gray level, whereby the front of screen quality index (L) can be calculated as a sum total corresponding to the area at the gray level. In the present invention, in particular examples as described in detail below, some types of front of screen quality indices (L) can be used as the front of screen quality index (L) in order to reduce the effect of a background and the difference with respect to a visual check.

Then, the calculated front of screen quality index (L) is compared to a predefined quality standard (L0) (Step 5). When L is substantially equal to L0, the LCD panel to be checked has the same quality level as the quality standard (Step 6). When L is equal to or less than L0, the LCD panel to be checked is considered to satisfy the quality standard and thus the LCD panel is recognized to be acceptable. When L exceeds L0, the LCD panel to be checked is not considered to satisfy the quality standard and thus the LCD panel may be recognized as rejection.

The particular examples of the front of screen quality index (L) will be described in detail below. First, a basic example of the front of screen quality index (L) is expressed as the following equation (1):

$$L = \sum_{i=1}^{n} Si \cdot Ii \qquad (1)$$

where
  Si: the area ratio of the region having the i-th differential value, and
  Ii: the i-th differential value.

In the example expressed as the above equation (1), the front of screen quality index (L) is calculated by use of the area at each gray level. In this case, the front of screen quality index (L) has only to be calculated as the sum total corresponding to the area at the gray level. Some modifications of the equation itself are therefore considered to be within the scope of the invention. For example, the differential value may be taken as 0, 1, ..., n−1 by scaling the differentiated image into n gray levels. Alternatively, the differential value may be taken as 0, 1, ..., (n−1)/n by standardizing the differentiated image. Moreover, the area ratio can be taken as not only the ratio of the area having the differential value to the measured area but also the actual area or the number of dots of the measured region or the number of dots per unit area. Moreover, an additional index can be calculated in accordance with the value calculated by this equation. Differentiating the captured image means differentiating the absolute value of the luminance of the captured image. The differentiated image can be calculated by calculating the difference with respect to adjacent dots (one neighboring dot, eight surrounding dots and so on), for example. Furthermore, luminance data may be scaled into n gray levels before the differentiation of the image, or the differential value may be scaled into n gray levels after the differentiation of the image.

Next, one modification of the front of screen quality index (L) is expressed as the following equation (2):

$$L = \sum_{i=1}^{n} Si \cdot (Ii - Ib) \qquad (2)$$

where
  Si: the area ratio of the region having the i-th differential value,
  Ii: the i-th differential value, and
  Ib: a background value.

Compared to the example expressed as the equation (1), the example expressed as the above equation (2) subtracts the background value from the differential value and thus this example can reduce a variation caused due to a back light performance and a brightness of a surrounding environment. The background value Ib may be taken as an average value over the panel. Any value will do as far as the value can contribute to reducing the above-mentioned variation.

Next, another modification of the front of screen quality index (L) is expressed as the following equations (3) and (4):

$$L = \sum_{i=1}^{n} Si \cdot Ii \cdot di \qquad (3)$$

or $$L = \sum_{i=1}^{n} Si \cdot (Ii - Ib) \cdot di \qquad (4)$$

where
  Si: the area ratio of the region having the i-th differential value,
  Ii: the i-th differential value,
  Ib: the background value, and
  di: the i-th weighting.

In the examples expressed as the above equations (3) and (4), the weighting is changed in accordance with the gray level, whereby the difference with respect to the visual check can be reduced. For simplicity, the same constant may be used for all the gray levels.

Preferably, the above-described i-th weighting di is substantially increased as i approaches n. The reason is that the more weighting is increased because the region having the higher differential value is visually more noticeable. The change in the weighting may be a linear increase, an exponential increase or a macro increase with a micro increase and decrease. More preferably, the above-described i-th weighting di is expressed as the following equation (5):

$$Di = di' \cdot s \qquad (5)$$

where
  di': the constant for combining a result of the visual check and a result of calculation, and
  s: a standard deviation of the luminance.

The example of the actual evaluation of the front of screen quality of the LCD panel in accordance with the flow chart shown in FIG. 1 will be described. The LCD panel for ThinkPad® P.C. was used as the LCD panel to be checked. An image level (over the whole image) obtained by visually checking this LCD panel was Lm=2.0. A criterion of the image level Lm obtained by the visual check is as follows.

Lm=1.0: No one can recognize the non-uniformity.

Lm=1.5: An inspector can recognize the non-uniformity, but ordinary laymen cannot recognize the non-uniformity.

Lm=2.0: Even the ordinary laymen can recognize the non-uniformity, and the ordinary laymen consider that the non-uniformity does not have the effect on the front of screen quality.

Lm=2.5: Even the ordinary laymen can recognize the non-uniformity, and half of the ordinary laymen consider that the non-uniformity has the effect on the front of screen quality.

Lm=3.0: Even the ordinary laymen can recognize the non-uniformity, and all of the ordinary laymen consider that the non-uniformity has the effect on the front of screen quality.

The captured image is the example shown in FIG. 2. The differentiated image is the example shown in FIG. 3. The differentiated image shown in FIG. 3 was calculated by use of the following equation (6) given in accordance with the above equation (4). That is, the images of regions A to D in FIG. 2 were scaled into 8 gray levels and the calculation was performed by using the weighting for scaling the image into 8 gray levels, whereby the following result could be obtained. When the same processing was performed for scaling the image into 4 gray levels or 16 gray levels, the values approximating closely to these data were obtained. The result is shown in Table 1.

$$L = \sum_{i=1}^{n} (Si/N) \cdot (Ii/Grad) \cdot s \cdot d \quad (6)$$

where

Si: the area (the number of dots) of the region having the i-th differential value, N: the area (the number of dots) of the measured region, Ii: the i-th differential value, i in this embodiment, Grad: the number of gray levels of the differential value, 8 in this embodiment, s: the standard deviation of the variation in the luminance in the measured region, and d: 1/50 (the constant) in this embodiment.

TABLE 1

| | Σ(Si/N) · (Ii/Grad) | s | L |
|---|---|---|---|
| A) whole image | 29.88 | 3.67 | 2.20 |
| B) | 28.44 | 3.86 | 2.20 |
| C) | 211.65 | 0.16 | 0.69 |
| D) | 186.39 | 0.25 | 0.93 |

From the above result, it is seen that the higher front of screen quality index L is calculated for the region having the more non-uniformity. The following fact is also seen. That is, the value of the front of screen quality index for the whole image is substantially the same as the visual image level. Thus, according to the method of evaluating the front of screen quality of the LCD panel of the present invention, the front of screen quality evaluation for the non-uniformity, the non-uniformity or the like can be performed similarly to a human sense.

In the above description of the method of evaluating the front of screen quality according to the present invention, any conventional well-known methods of capturing and differentiating the image can be used to capture and differentiate the image. Typically, the use of a function of an image processing apparatus is sufficient to capture and differentiate the image. Moreover, the front of screen quality index L can be easily calculated by programming a simple software because an object to be processed is a digital image.

As can be seen from the above description, according to the present invention, the image of the screen to be checked is captured, and the captured image is processed and evaluated. Thus, the method can quantitatively evaluate the sensuous front of screen quality evaluation for the non-uniformity or the like. Therefore, the method can contribute greatly to the front of screen quality stabilization and the high quality control of the screen to be checked or preferably the LCD panel. Moreover, the value of the front of screen quality index for the whole image obtained by the present invention is substantially the same as the image level obtained by the visual check. Thus, according to the method of evaluating the front of screen quality of the LCD panel of the present invention, the front of screen quality evaluation for the non-uniformity, the non-uniformity or the like can be performed similarly to the human sense. Furthermore, according to the method of the present invention, not only the whole panel but also a part of the panel can be checked by the same criterion.

What is claimed is:

1. A method of quantitatively evaluating a front of screen quality to be checked, comprising the steps of:

capturing an image of the screen to be checked; and processing and evaluating the captured image;

wherein said image processing and evaluation is executed in accordance with a front of screen quality index (L) obtained from a differentiated image calculated by differentiating the captured image;

wherein said differentiated image is scaled into n gray levels, and said front of screen quality index (L) is calculated in accordance with the following equation:

$$L = \sum_{i=1}^{n} Si * Ii$$

where

Si: an area ratio of a region having the i-th differential value, and

Ii: the i-th differential value.

2. A method of quantitatively evaluating a front of screen quality to be checked, comprising the steps of:

capturing an image of the screen to be checked; and processing and evaluating the captured image;

wherein said image processing and evaluation is executed in accordance with a front of screen quality index (L) obtained from a differentiated image calculated by differentiating the captured image;

wherein said differentiated image is scaled into n gray levels, and said front of screen quality index (L) is calculated in accordance with the following equation:

$$L = \sum_{i=1}^{n} Si * (Ii - Ib)$$

where

Si: an area ratio of a region having the i-th differential value, and

Ii: the i-th differential value, and

Ib: a background value.

3. A method of quantitatively evaluating a front of screen quality to be checked, comprising the steps of:

capturing an image of the screen to be checked; and processing and evaluating the captured image;

wherein said image processing and evaluation is executed in accordance with a front of screen quality index (L) obtained from a differentiated image calculated by differentiating the captured image;

wherein said differentiated image is scaled into n gray levels, and said front of screen quality index (L) is calculated in accordance with the following equation:

$$L = \sum_{i=1}^{n} Si * Ii * di$$

or $$L = \sum_{i=1}^{n} Si * (Ii - Ib) * di$$

where

Si: an area ratio of a region having the i-th differential value, and

Ii: the i-th differential value, and

Ib: a background value, and di: the i-th weighting.

4. The method according to claim 3, wherein said di is substantially increased as i approaches n.

5. The method according to claim 3, wherein said di is calculated in accordance with the following equation:

$$Di = di' \cdot s$$

where di': a constant for combining a result of a visual check and a result of calculation, and s: a standard deviation of luminance.

6. The method according to any one of claims 1–5, wherein said front of screen quality index (L) is compared to a predefined quality standard L0 of the front of screen quality index, and when L is substantially equal to L0, a determination is made that the front of screen quality of the screen to be checked is the same as said quality standard.

* * * * *